(12) United States Patent
Ji et al.

(10) Patent No.: US 12,192,972 B2
(45) Date of Patent: Jan. 7, 2025

(54) METHOD AND DEVICE FOR DETERMINING TIME-DOMAIN RESOURCE

(71) Applicant: VIVO MOBILE COMMUNICATION CO., LTD., Dongguan (CN)

(72) Inventors: Zichao Ji, Dongguan (CN); Siqi Liu, Dongguan (CN); Huaming Wu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 364 days.

(21) Appl. No.: 17/715,937

(22) Filed: Apr. 7, 2022

(65) Prior Publication Data
US 2022/0232566 A1 Jul. 21, 2022

Related U.S. Application Data

(63) Continuation of application No. PCT/CN2020/119971, filed on Oct. 9, 2020.

(30) Foreign Application Priority Data

Oct. 14, 2019 (CN) .......................... 201910975254.8

(51) Int. Cl.
*H04W 72/0446* (2023.01)
(52) U.S. Cl.
CPC ............... *H04W 72/0446* (2013.01)
(58) Field of Classification Search
None
See application file for complete search history.

(56) References Cited

U.S. PATENT DOCUMENTS

2019/0124634 A1 4/2019 Li et al.
2022/0217741 A1* 7/2022 Yoshioka .......... H04W 72/1263

FOREIGN PATENT DOCUMENTS

CN 110311762 A 10/2019

OTHER PUBLICATIONS

International Search Report issued in corresponding International Application No. PCT/CN2020/119971, mailed Dec. 30, 2020, 4 pages.
ZTE et al, "NR sidelink physical layer structure", 3GPP TSG RAN WG1 #98bis, R1-1910297, Oct. 1, 2019.
First Office Action issued in related Chinese Application No. 201910975254.8, mailed Sep. 3, 2021, 7 pages.
Extended European Search Report issued in related European Application No. 20875835.9, mailed Oct. 27, 2022, 11 pages.
OPPO, "Physical layer procedure for NR-V2X sidelink", 3GPP TSG RAN WG1 #98bis, R1-1910375, mailed Oct. 2019, 12 pages.
ASUSTeK, "Discussion on sidelink physical layer procedure on NR V2X", 3GPP TSG RAN WG1 #98bis, R1-1911023, mailed Oct. 2019, 11 pages.

* cited by examiner

*Primary Examiner* — Angela Nguyen
(74) *Attorney, Agent, or Firm* — IPX PLLC

(57) ABSTRACT

Methods and devices for determining a time-domain resource are provided. An exemplary method includes determining, by a terminal device based on a first time-domain resource occupied by first information and a parameter K, a second time-domain resource occupied by second information corresponding to the first information. K is predefined, configured, indicated by the first information, or obtained based on processing time of the first information.

20 Claims, 2 Drawing Sheets

100

Determine, based on a first time-domain resource occupied by first information and a first target parameter K, a second time-domain resource occupied by second information corresponding to the first information — S102

100
Determine, based on a first time-domain resource occupied by first information and a first target parameter K, a second time-domain resource occupied by second information corresponding to the first information — S102
FIG. 1
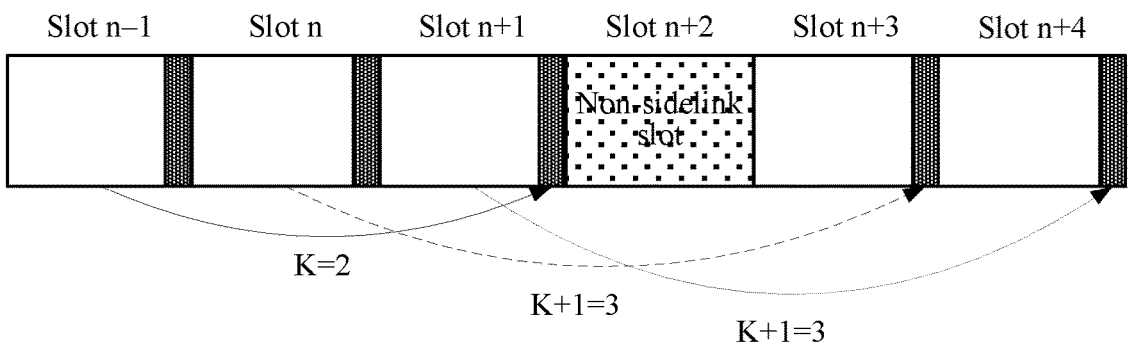
FIG. 2
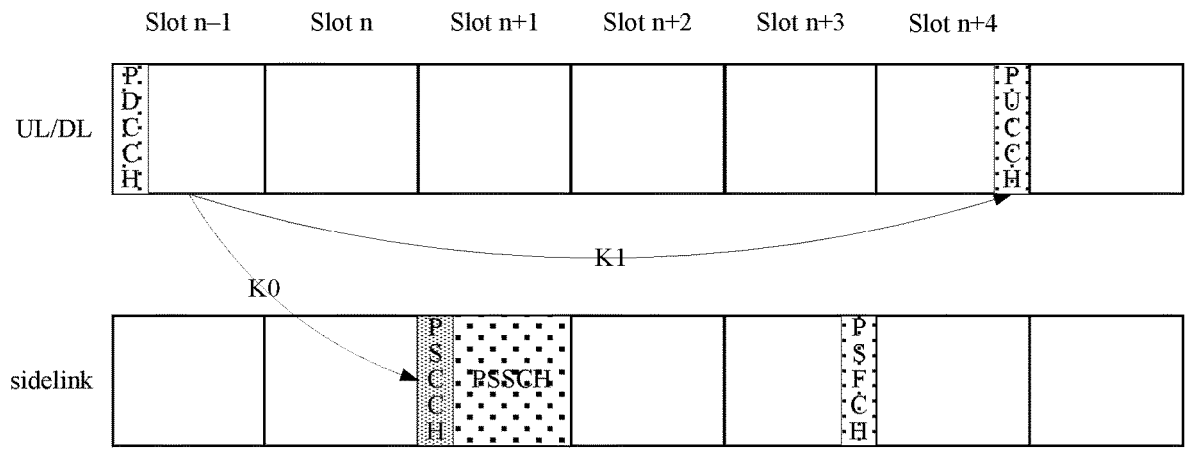
FIG. 3

METHOD AND DEVICE FOR DETERMINING TIME-DOMAIN RESOURCE

CROSS-REFERENCE TO RELATED APPLICATION

This application is a continuation of International Application No. PCT/CN2020/119971, filed on Oct. 9, 2020, which claims priority to Chinese Patent Application No. 201910975254.8, filed on Oct. 14, 2019, both of which are incorporated herein by reference in their entireties.

TECHNICAL FIELD

Embodiments of the present disclosure relate to the field of communications, and in particular, to a method and device for determining a time-domain resource.

BACKGROUND

To improve the reliability and effectiveness of SideLink (also referred to as direct communication link/SL) transmission, a sidelink Hybrid Automatic Repeat reQuest (HARD) is introduced in a New Radio (NR) system. During sidelink transmission, a sending device may send data/control information to a receiving device, and the receiving device determines whether the data/control information is successfully received. If the data/control information is successfully received, the receiving device feeds back an ACKnowledgement (ACK) to the sending device; or if the data/control information is not successfully received, the receiving device feeds back a Negative ACKnowledgement (NACK) to the sending device.

Before feeding back the ACK/NACK, the receiving device usually needs to determine, based on a time-domain interval determining parameter K, a time-domain resource occupied by a Physical Sidelink Feedback CHannel (PSFCH) used for carrying the ACK/NACK. However, the time-domain interval determining parameter K is still defined ambiguously. As a result, a transmission problem occurs easily because the sending device and the receiving device have inconsistent understanding of the time-domain interval determining parameter K, which affects communication effectiveness.

SUMMARY

According to a first aspect, a method for determining a time-domain resource is provided, where the method is executed by a terminal device, and the method includes:

determining, based on a first time-domain resource occupied by first information and a first target parameter K, a second time-domain resource occupied by second information corresponding to the first information, where K is predefined, configured, indicated by the first information, or obtained based on processing time of the first information.

According to a second aspect, a terminal device is provided, including:

a time-domain resource determining module, configured to determine, based on a first time-domain resource occupied by first information and a first target parameter K, a second time-domain resource occupied by second information corresponding to the first information, where K is predefined, configured, indicated by the first information, or obtained based on processing time of the first information.

According to a third aspect, a terminal device is provided, including: a processor, a memory, and a computer program stored in the memory and capable of running on the processor. When the computer program is executed by the processor, the steps of the method for determining a time-domain resource provided in the first aspect are implemented.

According to a fourth aspect, a computer-readable storage medium is provided, where the computer-readable storage medium stores a computer program. When the computer program is executed by a processor, the steps of the method for determining a time-domain resource provided in the first aspect are implemented.

BRIEF DESCRIPTION OF DRAWINGS

The accompanying drawings illustrated herein are provided to further understand the present application and form a part of the present application. The exemplary embodiments of the present application and the descriptions thereof are used to explain the present application and do not constitute an improper limitation on the present application. In the accompanying drawings:

FIG. 1 is a schematic flowchart of a method for determining a time-domain resource according to an embodiment of the present disclosure;

FIG. 2 is a schematic diagram of specific application of a method for determining a time-domain resource according to an embodiment of the present disclosure;

FIG. 3 is a schematic diagram of specific application of a method for determining a time-domain resource according to another embodiment of the present disclosure;

DETAILED DESCRIPTION

Figure 4:
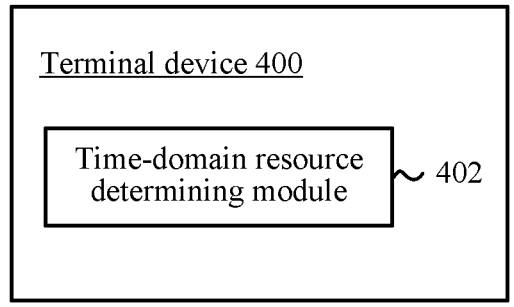
FIG. 4 is a schematic structural diagram of a terminal device according to an embodiment of the present disclosure.

To make the objectives, technical solutions, and advantages of the present application clearer, the following clearly describes the technical solutions of the present application with reference to the specific embodiments of the present application and the corresponding accompanying drawings. Apparently, the described embodiments are merely some rather than all of the embodiments of the present application. All other embodiments obtained by a person of ordinary skill in the art based on the embodiments of the present application shall fall within the protection scope of the present application. The term "and/or" in the embodiments of this specification indicates at least one of the former item and the latter item.

It should be understood that, the technical solutions in the embodiments of the present disclosure may be applied to various communications systems, such as a Long Term Evolution (LTE) sidelink system, an NR sidelink system, or a subsequently evolved sidelink communications system.

In the embodiments of the present disclosure, a terminal device may include but is not limited to a Mobile Station (MS), a Mobile Terminal, a mobile telephone, a User Equipment (UE), a handset, a portable equipment, a vehicle, and the like. The terminal device may communicate with one or more core networks by using a Radio Access Network (RAN). For example, the terminal device may be a mobile phone (or referred to as a "cellular" phone), or a computer having a wireless communication function; or the terminal device may be a portable, pocket-sized, handheld, computer built-in, or in-vehicle mobile apparatus.

In the embodiments of the present disclosure, a network device is an apparatus that is deployed in the radio access network and that is used to provide a wireless communication function for the terminal device. The network device may be a base station, and the base station may include various types of macro base stations, micro base stations, relay nodes, access points, and the like. In systems using different radio access technologies, names of devices having a base station function may be different. For example, in an LTE network, the network device is referred to as an evolved NodeB (Evolved NodeB, eNB or eNodeB); and in a 3rd Generation (3G) network, the network device is referred to as a NodeB or a network device in the subsequent evolved communications system. However, the terms do not constitute a limitation.

As shown in FIG. 1, an embodiment of the present disclosure provides a method 100 for determining a time-domain resource. The method may be performed by a terminal device. In other words, the method may be performed by software or hardware installed on the terminal device. The method includes the following steps:

S102: Determine, based on a first time-domain resource occupied by first information and a first target parameter K, a second time-domain resource occupied by second information corresponding to the first information.

In some embodiments, the first target parameter K may be predefined. For example, K is specified by a protocol. The first target parameter K may alternatively be configured (in advance). For example, a network device configures the first target parameter K for the terminal device in advance; or a sidelink sending device configures the first target parameter K for a sidelink receiving device in advance.

In some embodiments, the first target parameter K may alternatively be indicated by the first information. In this example, the first information may be obtained from the network device; and the network device may explicitly or implicitly indicate the first target parameter K based on the first information.

In some embodiments, the first target parameter K may alternatively be obtained based on processing time of the first information. For example, the processing time of the first information is defined or configured (in advance); X is an upper limit of the processing time of the first information; and K may be a quantity of minimum time-domain units temporally greater than or equal to X. For another example, X is an upper limit that is of the processing time of the first information and that is obtained based on another configuration parameter; and K may be a quantity of minimum time-domain units temporally greater than X. For still another example, X is actual processing time of the first information; and K may be a quantity of minimum time-domain units temporally greater than X.

In this example, a time-domain granularity of K is greater than a time-domain granularity of X. Specifically, for example, X is obtained by counting numbers of symbols; and K is obtained by counting numbers of slots. The above-mentioned K may be a quantity of minimum time-domain units temporally greater than or equal to X. For example, one slot includes 14 symbols. When X=10, K=1; when X=14, K=1; when X=15, K=2; or the like.

It should be noted that, the time-domain unit in the embodiments of this specification may specifically be a time-domain slot or a time-domain unit of another granularity. The following embodiments are mainly described by using an example in which the time-domain unit is a time-domain slot.

It should be further noted that, the following embodiments of this specification may also provide (counting by numbers of) physical time-domain elements, (counting by numbers of) logic time-domain elements, or the like. Physical counting means numbering slots one by one in an order of absolute time.

During sidelink slot configuration, some physical slots fail to be used for Physical Sidelink Shared CHannel (PSSCH) or Physical Sidelink Control CHannel (PSCCH) transmission, for example, fail to be used as UpLink (UL)/DownLink (DL) slots of a Uu air interface (an uplink/downlink interface between the base station and the UE), slots occupied by sidelink synchronization signals, such as SideLink Synchronization Signal Block (SL-SSB)/SideLink Synchronization Signal (SLSS)/Physical SideLink Broadcast CHannel (PSBCH), slots reserved by a system, or the like. After physical slots failing to be used for sidelink PSCCH/PSSCH transmission are removed, remaining physical slots are renumbered, thereby obtaining logic numbers of slots.

In some embodiments, the present disclosure may be applied to sidelink transmission. The first information may specifically be sidelink data information, sidelink control information, or the like; and a carrier of the first information includes a PSSCH or a PSCCH. Accordingly, the second information may be HARQ feedback, and a carrier of the second information includes a PSFCH.

In some embodiments, before S102, the terminal device may further receive the first information. After determining the second time-domain resource occupied by the second information in S102, the terminal device may further send the second information by using the second time-domain resource.

When step S102 is specifically performed, for example, when the first information is transmitted on an $n^{th}$ slot, the first time-domain resource may be all symbols in the $n^{th}$ slot, and this step may determine, as the second time-domain resource, symbols that are in an $(n+a)^{th}$ slot and that are used for transmitting the second information, where a is a minimum integer greater than or equal to the first target parameter K. Usually, to improve the timeliness of HARQ feedback, a may be equal to the first target parameter K.

According to the method for determining a time-domain resource in this embodiment of the present disclosure, the parameter K may be predefined, configured, indicated by the first information, or obtained based on processing time of the first information. In this way, the terminal device may determine, based on the first time-domain resource occupied by the first information and the parameter K, the second time-domain resource occupied by the second information corresponding to the first information, to resolve a transmission problem caused because terminal devices have inconsistent understanding of the parameter K. In addition, the terminal device may also transmit the second information by using the second time-domain resource, thereby improving communication effectiveness.

To describe the method for determining a time-domain resource in this embodiment of the present disclosure in detail, the following provides specific description with reference to different application scenarios.

Scenario 1:

The carrier of the first information is a PSSCH/PSCCH, and the carrier of the second information is a PSFCH. In this scenario, after receiving the PSSCH/PSCCH, the sidelink receiving device determines, based on a first time-domain resource occupied by the PSSCH/PSCCH and the first target parameter K, a second time-domain resource occupied by the PSFCH. Then, the sidelink receiving device may further send HARQ feedback (including an ACK/a NACK) based on the second time-domain resource.

In addition, after sending the PSSCH/PSCCH, the sidelink sending device determines, based on the first time-domain resource occupied by the PSSCH/PSCCH and the first target parameter K, the second time-domain resource occupied by the PSFCH. Then, the sidelink sending device may further receive the HARQ feedback based on the second time-domain resource.

In scenario 1, solution 1 and solution 2 that are classified based on resources of the first target parameter K are provided for description.

Solution 1:

The first target parameter K may be predefined/configured (in advance).

The first target parameter K in the embodiments of this specification may be referred to as a time-domain interval determining parameter, for example, a time-domain interval determining parameter between a PSSCH/PSCCH and a corresponding PSFCH. In the embodiments of this specification, the parameter K is named based on a role that the parameter K plays. Therefore, the parameter K may be denoted by other similar terms, for example, a time-domain determining parameter or a resource determining parameter.

In some embodiments, one or more K values may be configured for each resource pool. This resource pool may be a resource pool to which a resource occupied by at least one of a PSSCH, a PSCCH, and a PSFCH belongs.

Before S102 in the foregoing embodiment, the terminal device may further select one first parameter from a plurality of first parameters K' configured for a resource pool to obtain K.

Herein, that the terminal device selects one first parameter from the plurality of first parameters K' to obtain K may be: The terminal device directly selects K, where K is one of the plurality of K'. Alternatively, the terminal device selects one first parameter K' and processes (for example, rounding up to an integer, or rounding down to an integer) the selected first parameter K' to obtain K.

In a case that a plurality of K' values are configured for a resource pool, different K' values may be used to configure different PSCCH/PSSCH/PSFCH resources. When the terminal device uses one PSCCH/PSSCH/PSFCH resource for transmission, a K value corresponding to the PSCCH/PSSCH/PSFCH resource is used by default.

Specifically, the resource pool may include a plurality of resource subsets, and first parameters K' configured for at least two of the resource subsets are different. The terminal device may select K from a plurality of first parameters K' configured for a target resource pool, where a resource subset corresponding to K is used by the terminal device to transmit at least one of the PSSCH, the PSCCH, and the PSFCH.

In some embodiments, defining/configuring (in advance) (also applicable to K', which is similar below) of K may alternatively be counting physical slots (numbers) or logic slots (numbers).

When K is obtained by counting physical slots, a is also obtained by counting physical slots by default; and when K is obtained by counting logic slots, a is also obtained by counting logic slots by default.

The following provides, for description, solution 1.1 and solution 1.2 that respectively correspond to a case in which a K value is obtained by counting physical slots and a case in which a K value is obtained by counting logic slots.

Solution 1.1: K is obtained by counting physical slot numbers. It is supported that a plurality of K values are used in each resource pool. S102 may specifically be:

Determine, based on the first time-domain resource occupied by the first information and a sum of K and a second target parameter Z (namely, K+Z), the second time-domain resource occupied by the second information corresponding to the first information, where Z includes at least one of the following between the first time-domain resource and the second time-domain resource:

a quantity of time-domain units in a non-target resource pool;

a quantity of time-domain units that are in the target resource pool but are not used to transmit the first information; and a quantity of time-domain units that are in the target resource pool but are not used to transmit the second information.

The target resource pool includes a resource pool to which the first time-domain resource and/or the second time-domain resource belong/belongs.

Specifically, for example, when the carrier of the first information is a PSSCH, and the carrier of the second information is a PSFCH, Z may be a quantity of sidelink slots (including non-sidelink slots and sidelink slots of another resource pool) that are between the PSSCH and the corresponding PSFCH and that are of a resource pool different from a local resource pool, or a quantity of slots (including non-sidelink slots, sidelink slots of another resource pool, and slots used for SSB transmission of the local resource pool) that are not used for PSCCH/PSSCH/PSFCH transmission of the local resource pool.

Before a slot used for transmitting the PSFCH, Z sidelink slots that do not belong to the local resource pool and/or Z slots that are not used for PSCCH/PSSCH/PSFCH transmission of the local resource pool exist in the terminal device. The terminal device determines a value of K+Z according to the foregoing regulation.

The non-sidelink slot in the embodiments of this specification may specifically be a slot that does not include a sidelink symbol.

In solution 1.1, the second time-domain resource includes the $a^{th}$ time-domain unit after the first time-domain resource, where a is a minimum integer greater than or equal to K+Z, and both a and K are obtained by counting physical time-domain units.

It may be understood that, in another embodiment, the value of (K+Z) may be a parameter. Alternatively, one or more values of (K+Z) may be directly configured in each resource pool.

Solution 1.2: When K is obtained by counting logic slot numbers, K does not need to be further processed.

In solution 1.2, the second time-domain resource includes the $a^{th}$ time-domain unit after the first time-domain resource, where a is a minimum integer greater than or equal to K, and both a and K are obtained by counting physical time-domain units.

To describe the foregoing solution 1.1 in detail, description is given below with reference to a specific embodiment. In this embodiment, it is stipulated, in a protocol, that K=2, and K is obtained by counting physical slots. In this case, the terminal device may determine a time-domain interval between the PSSCH and the PSFCH based on the K value.

In an example, as shown in FIG. 2, the terminal device transmits the PSSCH on physical slot n−1, and assumes that K=2 to obtain a time-domain position of the PSFCH. Both slot n and slot n+1 are sidelink slots. The terminal device derives, based on a=K=2, that the PSFCH is at slot n+1.

In an example, as shown in FIG. 2, the terminal device transmits the PSSCH on physical slot n, and assumes that K=2. When the terminal device counts up to slot n+2, the PSFCH fails to be mapped. Because slot n+2 is a non-sidelink slot, the terminal device automatically increases the K value by 1. The terminal device continues counting up to slot n+3, and derives, based on a=K+1=3, that the PSFCH is at slot n+3.

In an example, as shown in FIG. 2, the terminal device transmits the PSSCH on physical slot n+1, and assumes that K=2. When the terminal device counts up to slot n+2, a>=K still fails to be satisfied. Because slot n+2 is a non-sidelink slot, the terminal device automatically increases the K value by 1. The terminal device continues counting up to slot n+4, and derives, based on a=K+1=3, that the PSFCH is at slot n+4.

Solution 1.2:

The carrier of the first information is a PSSCH/PSCCH (the following is described by using only a case, as an example, in which the carrier is a PSSCH, and a case in which the carrier is a PSCCH is similar to this), and the carrier of the second information is a PSFCH. The time-domain interval determining parameter K between the PSSCH and the corresponding PSFCH is indicated implicitly, for example, obtained based on processing time of the PSSCH.

In an example, processing time (required by a system) of a sidelink receiving device-side PSSCH may be determined.

In some embodiments, before S102, the terminal device may further determine a third target parameter X in advance. The first target parameter K is a quantity of minimum physical/logic time-domain units temporally greater than or equal to X.

In an example, the processing time of the PSSCH is preconfigured/configured (in advance).

For example, one or more X' values are configured for each resource pool. X' is an upper limit of the processing time of the PSSCH, and may be obtained by counting symbols. The processing time of the PSSCH may be obtained by counting symbols.

The resource pool in this embodiment may be a resource pool to which a resource occupied by at least one of a PSSCH, a PSCCH, and a PSFCH belongs.

When a plurality of X' values are configured for each resource pool, the determining the third target parameter X includes: selecting one third parameter from a plurality of third parameters X' configured for a resource pool to obtain X, where the resource pool includes the resource pool to which the first time-domain resource (for example, a resource occupied by the PSSCH) and/or the second time-domain resource (for example, a resource occupied by the PSFCH) belong/belongs.

In some embodiments, one or more of third parameters X' may be configured for each resource pool. Before S102 in the foregoing embodiment, the terminal device may further select one third parameter from a plurality of third parameters X' configured for a resource pool to obtain X.

Herein, that the terminal device selects one third parameter from the plurality of third parameters X' to obtain X may be: The terminal device directly selects X, where X is one of the plurality of X'. Alternatively, the terminal device selects one third parameter X' and processes (for example, rounding up to an integer, or rounding down to an integer) the selected third parameter X' to obtain X.

In a case that a plurality of X' values are configured for a resource pool, different X' values may be used to configure different PSCCH/PSSCH/PSFCH resources. When the terminal device uses one PSCCH/PSSCH/PSFCH for transmission, an X value corresponding to the PSCCH/PSSCH/PSFCH resource is used by default.

Specifically, the resource pool may include a plurality of resource subsets, and third parameters X' configured for at least two of the resource subsets are different. The selecting, by the terminal device, one third parameter from a plurality of third parameters X' configured for the target resource pool to obtain X includes: selecting X from the plurality of third parameters X' configured for the target resource pool, where a resource subset corresponding to X is used by the terminal device to transmit at least one of the PSSCH, the PSCCH, and the PSFCH.

The terminal device may determine a corresponding X value during transmission of the PSCCH/PSSCH/PSFCH.

In an example, X is an upper limit that is of the processing time of a PSSCH and that is obtained based on at least one of the following: In some embodiments, X is an upper limit that is of the processing time of the first information and that is obtained based on at least one of the following:

1) a Sub-Carrier Space (SCS);
2) a terminal device capability supported by a target resource pool, where the target resource pool includes a resource pool to which the first time-domain resource and/or the second time-domain resource belong/belongs; and
3) a Demodulation Reference Signal (DMRS) pattern.

Specifically, a correspondence between processing time of a terminal device-side PSCCH/PSSCH and the SCS and/or the terminal device capability and/or the DMRS pattern may be predefined, for example, reusing processing time of a Physical Downlink Shared CHannel (PDSCH). Usually, the SCS and the DMRS pattern are already configurable (preconfigured) parameters. In some embodiments, the terminal device capability supported by the target resource pool is a configurable (preconfigured) parameter.

For example, X is an upper limit that is of processing time of a corresponding (maximum/minimum) terminal device-side PSCCH/PSSCH and that is required by a system under a certain or some SCS/terminal device capability/DMRS pattern configurations.

In some embodiments, uniform SCS/terminal device capability/DMRS patterns may be configured for all resource pools, that is, one resource pool has only one X value.

In some embodiments, different SCS/terminal device capability/DMRS pattern configurations may be used for different PSCCHs/PSSCHs/PSFCHs of one resource pool, that is, one resource pool has a plurality of X values. Corresponding PSCCH/PSSCH resources correspond to different X values. In this way, the terminal device may determine a corresponding X value during transmission of the PSCCH/PSSCH/PSFCH.

In some embodiments, X may alternatively be derived based on a terminal device type supported by the terminal device. In addition, different terminal device types require different X values. The terminal device type herein may be Pedestrian-UE (P-UE), Vehicle-UE (V-UE), or the like. The terminal device type may be determined based on an identifier ID of the terminal device, for example, may be a special ID range allocated to the P-UE.

In an example, X is actual processing time of a sidelink receiving device-side PSCCH/PSSCH. In some embodiments, the terminal device may determine actual processing time of the PSCCH/PSSCH based on the SCS/DMRS pattern/terminal device capability.

In some embodiments, the actual processing time of the sidelink receiving device-side PSCCH/PSSCH may be determined via negotiation between a sidelink sending device and a sidelink receiving device. For example, the sidelink receiving device notifies the sidelink sending device of a terminal device capability or processing time of a PSSCH/PSCCH supported by the sidelink receiving device. The sidelink sending device determines the actual processing time of the sidelink receiving device-side PSCCH/PSSCH based on feedback information of the sidelink receiving device.

For multicast HARQ feeding back, if feedback information of different sidelink receiving devices correspond to actual processing time of different PSSCHs/PSCCHs, the sidelink sending device assumes that actual processing time of current PSCCH/PSSCH transmission is maximum actual processing time in all feedback. The sidelink sending device may further notify all the multicasting sidelink receiving devices of the maximum actual processing time.

In addition, for PSCCH/PSSCH/PSFCH transmission scheduled by a network device, the sidelink sending device and/or the sidelink receiving device may further report, to the network device, actual processing time of PSSCH/PSCCH supported by the sidelink sending device and/or the sidelink receiving device, so that the network device can schedule a time-domain resource.

In addition, the sidelink sending device may further select an appropriate resource pool or resource for PSCCH/PSSCH transmission before S102 based on the actual processing time of the sidelink receiving device-side PSCCH/PSSCH.

In some embodiments, defining/configuring (in advance) of a K value may alternatively be counting physical slots (numbers) or logic slots (numbers).

When K (equivalent to K', which is similar below) is obtained by counting physical slots, a is also obtained by counting physical slots by default; and when K is obtained by counting logic slots, a is also obtained by counting logic slots by default.

The following provides, for description, solution 2.1 and solution 2.2 that respectively correspond to a case in which a K value is obtained by counting physical slots and a case in which a K value is obtained by counting logic slots.

Solution 2.1: K is obtained by counting physical slot numbers. It is supported that a plurality of K (equivalent to K') values are used in each resource pool. S102 may specifically be:

determining, based on the first time-domain resource occupied by the first information and a sum of K and a second target parameter Z, the second time-domain resource occupied by the second information corresponding to the first information, where Z includes at least one of the following between the first time-domain resource and the second time-domain resource:

a quantity of time-domain units in a non-target resource pool;

a quantity of time-domain units that are in the target resource pool but are not used to transmit the first information; and a quantity of time-domain units that are in the target resource pool but are not used to transmit the second information.

K is a quantity of minimum physical time-domain units temporally greater than X.

The target resource pool includes the resource pool to which the first time-domain resource and/or the second time-domain resource belong/belongs.

Specifically, when the carrier of the first information is a PSSCH, and the carrier of the second information is a PSFCH, Z may be a quantity of sidelink slots (including non-sidelink slots and sidelink slots of another resource pool) that are between the PSSCH and the corresponding PSFCH and that are of a resource pool different from a local resource pool, or a quantity of slots (including non-SL slots, SL slots of another resource pool, and slots used for SSB transmission of the local resource pool) that are not used for PSCCH/PSSCH/PSFCH transmission of the local resource pool.

Before a slot used for transmitting the PSFCH, Z sidelink slots that do not belong to the local resource pool or Z slots that are not used for PSCCH/PSSCH/PSFCH transmission of the local resource pool exist in the terminal device. The terminal device automatically changes a value of (K+Z) according to the foregoing regulation. K is a quantity of minimum physical slots temporally greater than X.

In solution 2.1, the second time-domain resource includes the $a^{th}$ time-domain unit after the first time-domain resource, where a is a minimum integer greater than or equal to K+Z, and both a and K are obtained by counting physical time-domain units.

It may be understood that, in another embodiment, the value of (K+Z) may be a parameter. Alternatively, one or more values of (K+Z) may be directly configured in each resource pool.

Solution 2.2: When K is obtained by counting logic slot numbers, a K value does not need to be further determined. K is a quantity of minimum physical slots temporally greater than X.

In solution 2.2, the second time-domain resource includes the $a^{th}$ time-domain unit after the first time-domain resource, where a is a minimum integer greater than or equal to K, and both a and K are obtained by counting logic time-domain units.

Scenario 2:

During sidelink transmission, there are the following transmission resource allocation modes: a base station centralized scheduling mode (mode 1) and an independent terminal device resource selection mode (mode 2).

For mode 1, a network device schedules PSCCH/PSSCH transmission based on Downlink Control Information (DCI)/a PDSCH. In addition, a Physical Uplink Control CHannel (PUCCH) resource scheduled based on the DCI is used to report HARQ feedback to the network device. For ease of differentiation, in this embodiment, K0 is used to denote a time interval between the DCI and the PSCCH/PSSCH, and K1 is used to denote a time interval between the DCI and the PUCCH.

Alternatively, the time interval between the DCI and the PUCCH is indicated by relative time. For example, K0 is used to indicate a time-domain interval between the PSCCH/PSSCH and the PUCCH; and K1 is used to indicate a time-domain interval between the PSFCH and the PUCCH. For details, refer to FIG. 3. K0/K1 is explicitly indicated by DCI. For a role and definition of K0/K1, see description of K in the foregoing embodiments.

In other words, in this scenario, the carrier of the first information described in the foregoing embodiments includes a Physical Downlink Control CHannel (PDCCH), and the carrier of the second information includes a PSSCH or a PSCCH; or the carrier of the first information includes a PSSCH or a PSCCH, and the carrier of the second information includes a PUCCH; or the carrier of the first information includes a PSFCH, and the carrier of the second information includes a PUCCH.

In some embodiments, it is stipulated, in a protocol, that K0/K1 is obtained by counting physical slots/logic slots.

The following provides, for description, two solutions that respectively correspond to a case in which a K0/K1 value is obtained by counting physical slots and a case in which a K0/K1 value is obtained by counting logic slots, namely, solution 3.1 and solution 3.2.

Solution 3.1: K0/K1 is obtained by counting physical slot numbers. It is supported that a plurality of K0/K1 values are used in each resource pool. S102 may specifically be:

determining, based on the first time-domain resource occupied by the first information and a sum of K0/K1 and a second target parameter Z (namely, K0/K1+Z), the second time-domain resource occupied by the second information corresponding to the first information, where Z includes at least one of the following between the first time-domain resource and the second time-domain resource:

a quantity of time-domain units in a non-target resource pool;

a quantity of time-domain units that are in the target resource pool but are not used to transmit the first information; and a quantity of time-domain units that are in the target resource pool but are not used to transmit the second information.

The target resource pool includes a resource pool to which the first time-domain resource and/or the second time-domain resource belong/belongs.

Specifically, for example, Z may be a quantity of sidelink slots (including non-sidelink slots and sidelink slots of another resource pool) that are between the PSSCH and the corresponding PSFCH and that are of a resource pool different from a local resource pool, or a quantity of slots (including non-SL slots, SL slots of another resource pool, and slots used for SSB transmission of the local resource pool) that are not used for PSCCH/PSSCH/PSFCH transmission of the local resource pool.

Before a slot used for transmitting the PSFCH, Z sidelink slots that do not belong to the local resource pool or Z slots that are not used for PSCCH/PSSCH/PSFCH transmission of the local resource pool exist in the terminal device. The terminal device automatically changes a value of (K0/K1+Z) according to the foregoing regulation.

In solution 3.1, the second time-domain resource includes the $a^{th}$ time-domain unit after the first time-domain resource, where a is a minimum integer greater than or equal to (K0/K1+Z), and both a and K are obtained by counting physical time-domain units.

It may be understood that, in another embodiment, the value of (K0/K1+Z) may be a parameter. Alternatively, one or more values of (K0/K1+Z) may be directly configured in each resource pool.

Solution 3.2: In a case that a K0/K1 value is obtained by counting logic slot numbers, the K0/K1 value does not need to be further determined.

In solution 3.2, the second time-domain resource includes the $a^{th}$ time-domain unit after the first time-domain resource, where a is a minimum integer greater than or equal to K, and both a and K are obtained by counting physical time-domain units.

The method for determining a time-domain resource according to the embodiments of the present disclosure is described in detail above with reference to FIG. 1 to FIG. 3.

A terminal device according to an embodiment of the present disclosure is described in detail below with reference to FIG. 4.

FIG. 4 is a schematic structural diagram of a terminal device according to an embodiment of the present disclosure. As shown in FIG. 4, the terminal device 400 includes:

a time-domain resource determining module 402 that may be configured to determine, based on a first time-domain resource occupied by first information and a first target parameter K, a second time-domain resource occupied by second information corresponding to the first information, where K is predefined, configured, indicated by the first information, or obtained based on processing time of the first information.

According to the terminal device in this embodiment of the present disclosure, the time-domain interval determining parameter K may be predefined, configured, indicated by the first information, or obtained based on processing time of the first information. In this way, the terminal device may determine, based on the first time-domain resource occupied by the first information and the parameter K, the second time-domain resource occupied by the second information corresponding to the first information, to resolve a transmission problem caused because terminal devices have inconsistent understanding of the parameter K. In addition, the terminal device may also transmit the second information by using the second time-domain resource, thereby improving communication effectiveness.

In some embodiments, K is predefined or configured. The terminal device 400 further includes a parameter determining module, configured to select one first parameter from a plurality of first parameters K' configured for a target resource pool to obtain K, where the target resource pool includes a resource pool to which the first time-domain resource and/or the second time-domain resource belong/belongs.

In some embodiments, the target resource pool includes a plurality of resource subsets, and first parameters K' configured for at least two of the resource subsets are different; and the selecting one first parameter from a plurality of first parameters K' configured for a target resource pool to obtain K includes: selecting K from the plurality of first parameters K' configured for the target resource pool, where a resource subset corresponding to K is used by the terminal device to transmit the first information and/or the second information.

In some embodiments, K is predefined or configured, indicated by the first information, or obtained by counting physical time-domain units; and the time-domain resource determining module 402 may be configured to determine, based on the first time-domain resource occupied by the first information and a sum of K and a second target parameter Z, the second time-domain resource occupied by the second information corresponding to the first information, where Z includes at least one of the following between the first time-domain resource and the second time-domain resource:

a quantity of time-domain units in a non-target resource pool;

a quantity of time-domain units that are in the target resource pool but are not used to transmit the first information; and a quantity of time-domain units that are in the target resource pool but are not used to transmit the second information, where the target resource pool includes a resource pool to which the first time-domain resource and/or the second time-domain resource belong/belongs.

In some embodiments, K is predefined or configured, indicated by the first information, or obtained by counting logic time-domain units.

In some embodiments, K is specifically obtained based on a third target parameter X; and the terminal device 400 further includes a parameter determining module, configured to determine the third target parameter X, where X is an upper limit of the processing time of the first information, and the processing time of the first information is defined or configured; or X is an upper limit that is of the processing time of the first information and that is obtained based on another configuration parameter; or X is actual processing time of the first information.

In some embodiments, X is the upper limit of the processing time of the first information, and the processing time of the first information is defined or configured; or X is the upper limit that is of the processing time of the first information and that is obtained based on the another configuration parameter; and the parameter determining module is configured to:

select one third parameter from a plurality of third parameters X' configured for a target resource pool to obtain X, where the target resource pool includes a resource pool to which the first time-domain resource and/or the second time-domain resource belong/belongs.

In some embodiments, the target resource pool includes a plurality of resource subsets, and third parameters X' configured for at least two of the resource subsets are different; and the selecting one third parameter from a plurality of third parameters X' configured for a target resource pool to obtain X includes: select X from the plurality of third parameters X' configured for the target resource pool, where a resource subset corresponding to X is used by the terminal device to transmit the first information and/or the second information.

In some embodiments, X is an upper limit that is of the processing time of the first information and that is obtained based on at least one of the following:

SCS;

a terminal device capability supported by a target resource pool, where the target resource pool includes a resource pool to which the first time-domain resource and/or the second time-domain resource belong/belongs; and a DMRS pattern.

In some embodiments, the terminal device capability supported by the target resource pool is configurable.

In some embodiments, X is the upper limit that is of the processing time of the first information and that is obtained based on the another configuration parameter; and the parameter determining module is configured to:

obtain X based on a terminal device type supported by a target resource pool, where the target resource pool includes a resource pool to which the first time-domain resource and/or the second time-domain resource belong/belongs.

In some embodiments, X is the actual processing time of the first information; and before step 1, the terminal device 400 further includes a parameter determining module, configured to negotiate with a peer-end device to obtain X.

In some embodiments, the parameter determining module is configured to: receive a plurality of values of the actual processing time of the first information from the peer-end device; and use a maximum value of the received values of the actual processing time as X.

In some embodiments, the terminal device 400 further includes a sending module, send X to a network device, where the first information and/or the second information are/is scheduled and transmitted based on the network device.

In some embodiments, the terminal device 400 further includes a resource selection module, select a resource pool based on X, or select the first time-domain resource based on X.

In some embodiments, K is obtained by counting physical time-domain units; and the time-domain resource determining module 402 may be configured to determine, based on the first time-domain resource occupied by the first information and a sum of K and a second target parameter Z, the second time-domain resource occupied by the second information corresponding to the first information, where Z includes at least one of the following between the first time-domain resource and the second time-domain resource:

a quantity of time-domain units in a non-target resource pool;

a quantity of time-domain units that are in the target resource pool but are not used to transmit the first information; and a quantity of time-domain units that are in the target resource pool but are not used to transmit the second information.

K is a quantity of minimum physical time-domain units temporally greater than X.

The target resource pool includes the resource pool to which the first time-domain resource and/or the second time-domain resource belong/belongs.

In some embodiments, K is obtained by counting logic time-domain units and is a quantity of minimum physical time-domain units temporally greater than X.

In some embodiments, the second time-domain resource includes the $a^{th}$ time-domain unit after the first time-domain resource, where a is a minimum integer greater than or equal to K+Z, and both a and K are obtained by counting physical time-domain units; or a is greater than or equal to the minimum integer of K, and both a and K are obtained by counting logic time-domain units.

In some embodiments, a carrier of the first information includes a PSSCH or a PSCCH, and a carrier of the second information includes a PSFCH;

the carrier of the first information includes a PDCCH, and the carrier of the second information includes a PSSCH or a PSCCH;

the carrier of the first information includes a PSSCH or a PSCCH, and the carrier of the second information includes a PUCCH; or the carrier of the first information includes a PSFCH, and the carrier of the second information includes a PUCCH.

The terminal device 400 according to the embodiment of the present disclosure may be referenced to the flow corresponding to the method 100 according to the embodiment of the present disclosure. Furthermore, each unit/module of the terminal device 400 and the foregoing other operations and/or functions are used to implement the corresponding flow of the method 100, and can achieve the same or equivalent technical effect. For brevity, details are not described herein again.

The embodiments in this specification are described in a progressive manner. Each embodiment usually focuses on a difference from another embodiment. For a same or similar part of the embodiments, refer to each other. The device embodiment is described simply because the device embodiment is similar to the method embodiment. For related details, refer to partial description of the method embodiment.

Figure 5:
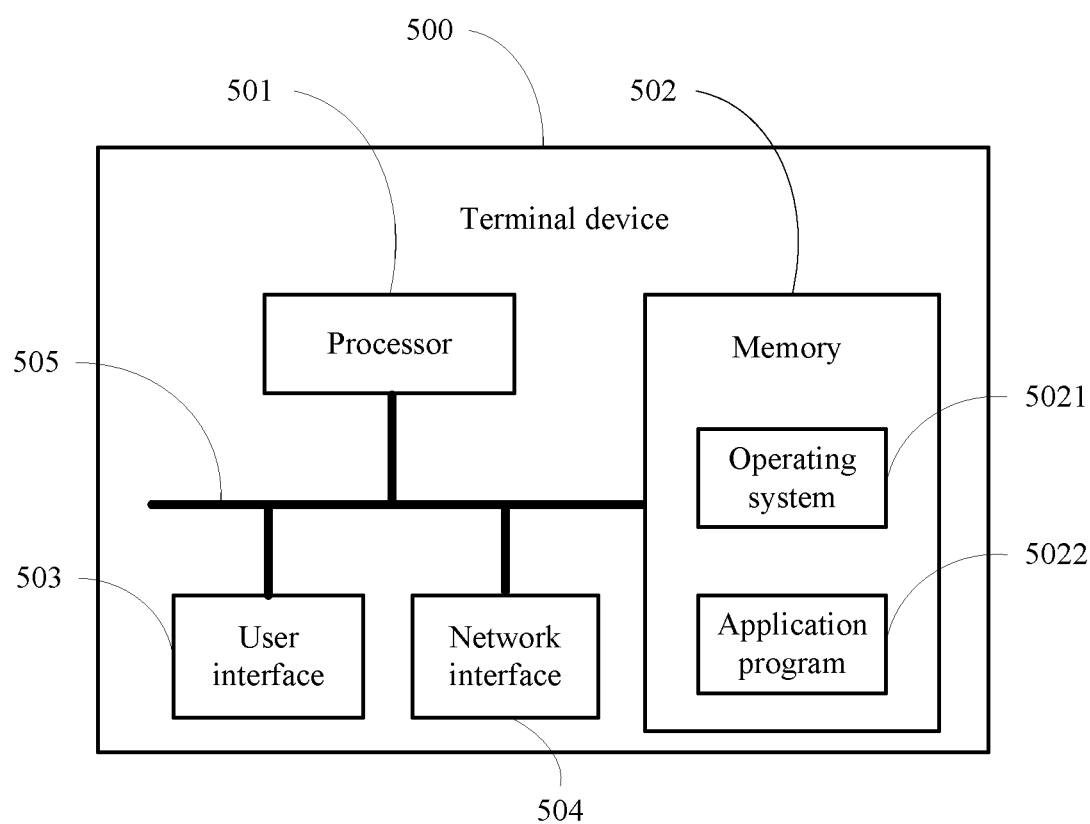
FIG. 5 is a schematic structural diagram of a terminal device according to another embodiment of the present disclosure.

FIG. 5 is a block diagram of a terminal device according to another embodiment of the present disclosure. The terminal device 500 shown in FIG. 5 includes at least one processor 501, a memory 502, at least one network interface 504, and a user interface 503. The components in the terminal device 500 are coupled together through a bus system 505. It may be understood that the bus system 505 is configured to implement connection and communication between these components. In addition to a data bus, the bus system 505 further includes a power bus, a control bus, and a status signal bus. However, for clarity of description, various buses are marked as the bus system 505 in FIG. 5.

The user interface 503 may include a display, a keyboard, a clicking device (for example, a mouse or a trackball), a touch panel, or a touchscreen.

It may be understood that the memory 502 in this embodiment of the present disclosure may be a volatile memory or a non-volatile memory, or may include both a volatile memory and a non-volatile memory. The non-volatile memory may be a Read-Only Memory (ROM), a Programmable Read-Only Memory (PROM), an Erasable Programmable Read-Only Memory (EPROM), an Electrically Erasable Programmable Read-Only Memory (EEPROM), or a flash memory. The volatile memory may be a Random Access Memory (RAM), used as an external cache. Through exemplary but not limitative description, many forms of RAMs may be used, for example, a Static Random Access Memory (SRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a Synchlink Dynamic Random Access Memory (SLDRAM), and a Direct Rambus Random Access Memory (DRRAM). The memory 502 in the system and the method that are described in the embodiments of the present disclosure is to include but is not limited to these memories and any other suitable types of memories.

In some implementations, the memory 502 stores the following elements: an executable module or a data structure, a subset thereof, or an extended set thereof: an operating system 5021 and an application 5022.

The operating system 5021 includes various system programs, for example, a framework layer, a kernel library layer, and a driver layer, and is configured to implement various basic services and process hardware-based tasks. The application 5022 includes various applications, for example, a media player and a browser, and is configured to implement various application services. A program for implementing the method in the embodiments of the present disclosure may be included in the application 5022.

In this embodiment of the present disclosure, the terminal device 500 further includes a computer program that is stored in the memory 502 and that can run on the processor 501, and when the computer program is executed by the processor 501, the steps of the method 100 are implemented.

The method disclosed in the foregoing embodiment of the present disclosure may be applied to the processor 501, or implemented by the processor 501. The processor 501 may be an integrated circuit chip having a signal processing capability. During implementation, the steps of the foregoing method may be completed by hardware integrated logic circuits in the processor 501 or instructions in a form of software. The processor 501 may be a general purpose processor, a Digital Signal Processor (DSP), an Application Specific Integrated Circuit (ASIC), a Field Programmable Gate Array (FPGA), another programmable logic device, a discrete gate, a transistor logic device, or a discrete hardware component. The processor may implement or perform the methods, steps, and logical block diagrams that are disclosed in the embodiments of the present disclosure. The general-purpose processor may be a microprocessor, any conventional processor, or the like. Steps of the methods disclosed with reference to the embodiments of the present disclosure may be directly executed and accomplished through a hardware decoding processor, or may be executed and accomplished by using a combination of hardware and software modules in the decoding processor. The software module may be located in a mature computer-readable storage medium in this field, such as a random access memory, a flash memory, a read-only memory, a programmable read-only memory, an electrically erasable programmable memory, or a register. The computer-readable storage medium is located in the memory 502, and the processor 501 reads information from the memory 502 and completes the steps of the foregoing method in combination with hardware of the processor 501. Specifically, the computer-readable storage medium stores a computer program, and when the computer program is executed by the processor 501, the steps of the foregoing embodiment of method 100 are performed.

It may be understood that the embodiments described in the embodiments of the present disclosure may be implemented by hardware, software, firmware, middleware, microcode, or a combination thereof. For implementation with hardware, the processing unit can be implemented in one or more ASIC, a DSP, a Digital Signal Processing Device (DSPD), a Programmable Logic Device (PLD), an FPGA, a general processor, a controller, a micro-controller, a microprocessor, and another electronic unit for implementing the functions of the present application, or their combinations.

For software implementation, the technology described in the embodiments of the present disclosure may be implemented by using a module (for example, a process or a function) that performs the function in the embodiments of the present disclosure. Software code may be stored in the memory and executed by the processor. The memory may be implemented inside or outside the processor.

The terminal device 500 can implement each process implemented by the terminal device in the foregoing embodiments, and can achieve the same or equivalent technical effect. To avoid repetition, details are not described herein again.

An embodiment of the present disclosure further provides a computer-readable storage medium. The computer-readable storage medium stores a computer program; when the computer program is executed by a processor, the processes in the foregoing embodiment of the method 100 are implemented; and a same technical effect can be achieved. To avoid repetition, details are not described herein again. The computer-readable storage medium may be a ROM, a RAM, a magnetic disk, a compact disc, or the like.

It should be noted that, in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. Without more restrictions, an element defined by a phrase "including a . . . " does not exclude presence of other identical elements in the process, method, article, or apparatus that includes the very element.

According to the foregoing descriptions of the implementations, a person skilled in the art may clearly understand that the method in the foregoing embodiments may be implemented by using software with a necessary general hardware platform. Certainly, the method in the foregoing embodiments may also be implemented by hardware. However, in many cases, the former is a preferred implementation. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the method described in the embodiments of the present disclosure.

The embodiments of the present disclosure are described above with reference to the accompanying drawings, but the present disclosure is not limited to the foregoing specific implementations. The foregoing specific implementations are merely exemplary instead of restrictive. Under enlightenment of the present disclosure, a person of ordinary skill in the art may make many forms without departing from the objective of the present disclosure and the protection scope of claims, all of which fall within the protection of the present disclosure.

The invention claimed is:

1. A method for determining a time-domain resource, wherein the method comprises:
   determining, by a terminal device based on a first time-domain resource occupied by first information and a first target parameter K, a second time-domain resource occupied by second information corresponding to the first information, wherein
   K is predefined, configured, indicated by the first information, or obtained based on processing time of the first information,
   wherein determining, by the terminal device based on the first time-domain resource occupied by the first information and the first target parameter K, the second time-domain resource occupied by the second information corresponding to the first information further comprises:
      determining, by the terminal device based on the first time-domain resource occupied by the first information and a sum of K and a second target parameter Z comprising a quantity of time-domain units, the second time-domain resource occupied by the second information corresponding to the first information.

2. The method according to claim 1, wherein K is predefined or configured; and before the determining, by the terminal device based on the first time-domain resource occupied by the first information and the first target parameter K, the second time-domain resource occupied by the second information corresponding to the first information, the method further comprises:
   selecting, by the terminal device, one first parameter from a plurality of first parameters K' configured for the target resource pool to obtain K, wherein
   the target resource pool comprises a resource pool to which the first time-domain resource or the second time-domain resource belongs.

3. The method according to claim 2, wherein
   the target resource pool comprises a plurality of resource subsets, and the plurality of first parameters K' configured for at least two of the resource subsets are different; and
   the selecting, by the terminal device, the one first parameter from the plurality of first parameters K' configured for the target resource pool to obtain K comprises:
      selecting, by the terminal device, K from the plurality of first parameters K' configured for the target resource pool, wherein one of the plurality resource subsets corresponding to K is used by the terminal device to transmit the first information or the second information.

4. The method according to claim 1, wherein K is predefined or configured, indicated by the first information, or obtained by counting physical time-domain units; and
   wherein the quantity of time-domain units comprises at least one of the following between the first time-domain resource and the second time-domain resource:
   a quantity of time-domain units in a non-target resource pool;
   a quantity of time-domain units that are in the target resource pool but are not used to transmit the first information; or
   a quantity of time-domain units that are in the target resource pool but are not used to transmit the second information, wherein
   the target resource pool comprises a resource pool to which the first time-domain resource or the second time-domain resource belongs.

5. The method according to claim 1, wherein K is predefined, configured, indicated by the first information, or obtained by counting logic time-domain units.

6. The method according to claim 1, wherein K is obtained based on a third target parameter X; and before the determining, by the terminal device based on the first time-domain resource occupied by the first information and the first target parameter K, the second time-domain resource occupied by the second information corresponding to the first information, the method further comprises:
   determining, by the terminal device, the third target parameter X, wherein
   X is an upper limit of the processing time of the first information, and the processing time of the first information is defined or configured;
   X is an upper limit that is of the processing time of the first information and that is obtained based on another configuration parameter; or
   X is actual processing time of the first information.

7. The method according to claim 6, wherein X is the upper limit of the processing time of the first information, and the processing time of the first information is defined or configured; or X is the upper limit that is of the processing time of the first information and that is obtained based on the another configuration parameter; and the determining, by the terminal device, the third target parameter X comprises:
   selecting, by the terminal device, one third parameter from a plurality of third parameters X' configured for the target resource pool to obtain X, wherein the target resource pool comprises the resource pool to which the first time-domain resource or the second time-domain resource belongs.

8. The method according to claim 7, wherein
the target resource pool comprises a plurality of resource subsets, and the plurality of third parameters X' configured for at least two of the resource subsets are different; and
the selecting, by the terminal device, one third parameter from the plurality of third parameters X' configured for the target resource pool to obtain X comprises: selecting, by the terminal device, X from the plurality of third parameters X' configured for the target resource pool, wherein one off the plurality of resource subsets corresponding to X is used by the terminal device to transmit the first information or the second information.

9. The method according to claim 6, wherein X is an upper limit that is of the processing time of the first information and that is obtained based on at least one of the following:
a Sub-Carrier Space (SCS);
a terminal device capability supported by the target resource pool, wherein the target resource pool comprises the resource pool to which the first time-domain resource or the second time-domain resource belongs; or
a Demodulation Reference Signal (DMRS) pattern.

10. The method according to claim 9, wherein the terminal device capability supported by the target resource pool is configurable.

11. The method according to claim 6, wherein X is the upper limit that is of the processing time of the first information and that is obtained based on the another configuration parameter, and the determining, by the terminal device, the third target parameter X comprises:
obtaining, by the terminal device, X based on a terminal device type supported by the target resource pool, wherein
the target resource pool comprises the resource pool to which the first time-domain resource or the second time-domain resource belongs; or
X is the actual processing time of the first information, and before the determining, by the terminal device based on the first time-domain resource occupied by the first information and the first target parameter K, the second time-domain resource occupied by the second information corresponding to the first information, the method further comprises:
negotiating, by the terminal device, with a peer-end device to obtain X.

12. The method according to claim 11, wherein the negotiating, by the terminal device, with the peer-end device to obtain X comprises:
receiving, by the terminal device, a plurality of values of the actual processing time of the first information from the peer-end device; and
using, by the terminal device, a maximum value of the received values of the actual processing time as X.

13. The method according to claim 11, wherein before the determining, by the terminal device based on the first time-domain resource occupied by the first information and the first target parameter K, the second time-domain resource occupied by the second information corresponding to the first information, the method further comprises;
sending, by the terminal device, X to a network device, wherein
the first information or the second information is scheduled and transmitted based on the network device.

14. The method according to claim 11, wherein before the determining, by the terminal device based on the first time-domain resource occupied by the first information and the first target parameter K, the second time-domain resource occupied by the second information corresponding to the first information, the method further comprises:
selecting, by the terminal device, the resource pool based on X; or
selecting, by the terminal device, the first time-domain resource based on X.

15. The method according to claim 6, wherein K is obtained by counting physical time-domain units;
K is a quantity of minimum physical time-domain units temporally greater than X; and
the target resource pool comprises the resource pool to which the first time-domain resource or the second time-domain resource belong-belongs.

16. The method according to claim 6, wherein K is obtained by counting logic time-domain units and is a quantity of minimum physical time-domain units temporally greater than X.

17. The method according to claim 4, wherein the second time-domain resource comprises the $a^{th}$ time-domain unit after the first time-domain resource, wherein
a is a minimum integer greater than or equal to K+Z, and both a and K are obtained by counting physical time-domain units; or
a is a minimum integer greater than or equal to K, and both a and K are obtained by counting logic time-domain units.

18. The method according to claim 1, wherein
a carrier of the first information comprises a Physical Sidelink Shared CHannel (PSSCH) or a Physical Sidelink Control CHannel (PSCCH), and a carrier of the second information comprises a Physical Sidelink Feedback CHannel (PSFCH);
the carrier of the first information comprises a Physical Downlink Control CHannel (PDCCH), and the carrier of the second information comprises a PSSCH or a PSCCH;
the carrier of the first information comprises a PSSCH or a PSCCH, and the carrier of the second information comprises a physical uplink control channel PUCCH; or
the carrier of the first information comprises a PSFCH, and the carrier of the second information comprises a PUCCH.

19. A terminal device, comprising: a memory, a processor, and a computer program stored in the memory and capable of running on the processor, wherein the computer program, when executed by the processor, causes the processor to perform a method for determining a time-domain resource, wherein the method comprises:
determining, by a terminal device based on a first time-domain resource occupied by first information and a first target parameter K, a second time-domain resource occupied by second information corresponding to the first information, wherein
K is predefined, configured, indicated by the first information, or obtained based on processing time of the first information,
wherein determining, by the terminal device based on the first time-domain resource occupied by the first information and the first target parameter K, the second time-domain resource occupied by the second information corresponding to the first information further comprises:

determining, by the terminal device based on the first time-domain resource occupied by the first information and a sum of K and a second target parameter Z comprising a quantity of time-domain units, the second time-domain resource occupied by the second information corresponding to the first information.

20. A non-transitory computer-readable storage medium, wherein the non-transitory computer-readable storage medium stores a computer program, and the computer program, when executed by a processor, causes the processor to perform a method for determining a time-domain resource, wherein the method comprises:

determining, by a terminal device based on a first time-domain resource occupied by first information and a first target parameter K, a second time-domain resource occupied by second information corresponding to the first information, wherein K is predefined, configured, indicated by the first information, or obtained based on processing time of the first information, wherein determining, by the terminal device based on the first time-domain resource occupied by the first information and the first target parameter K, the second time-domain resource occupied by the second information corresponding to the first information further comprises:

determining, by the terminal device based on the first time-domain resource occupied by the first information and a sum of K and a second target parameter Z comprising a quantity of time-domain units, the second time-domain resource occupied by the second information corresponding to the first information.

* * * * *